(12) United States Patent
Lee

(10) Patent No.: US 12,469,865 B2
(45) Date of Patent: Nov. 11, 2025

(54) APPARATUS FOR FUEL CELL SYSTEM

(71) Applicants: HYUNDAI MOTOR COMPANY, Seoul (KR); Kia Corporation, Seoul (KR)

(72) Inventor: Yong Hee Lee, Yongin-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 497 days.

(21) Appl. No.: 17/893,551

(22) Filed: Aug. 23, 2022

(65) Prior Publication Data

US 2023/0352710 A1 Nov. 2, 2023

(30) Foreign Application Priority Data

Apr. 28, 2022 (KR) .................. 10-2022-0052468

(51) Int. Cl.
*H01M 8/04746* (2016.01)
*H01M 8/04082* (2016.01)
*H01M 8/0432* (2016.01)
*H01M 8/0438* (2016.01)

(52) U.S. Cl.
CPC ... *H01M 8/04753* (2013.01); *H01M 8/04201* (2013.01); *H01M 8/04373* (2013.01); *H01M 8/04425* (2013.01)

(58) Field of Classification Search
CPC ......... H01M 8/04753; H01M 8/04201; H01M 8/04373; H01M 8/04425; H01M 8/04089; H01M 8/04298; H01M 8/0432; H01M 8/0438; H01M 8/04701; H01M 8/04746; H01M 8/04992; H01M 8/04328; H01M 8/04388
See application file for complete search history.

(56) References Cited

U.S. PATENT DOCUMENTS

| | | | |
|---|---|---|---|
| 6,387,556 B1 | 5/2002 | Fuglevand et al. | |
| 6,773,839 B2 | 8/2004 | Fuglevand et al. | |
| 2002/0018922 A1 | 2/2002 | Fuglevand et al. | |
| 2002/0031692 A1* | 3/2002 | Fuglevand | H01M 8/04768 429/430 |
| 2013/0004879 A1* | 1/2013 | Ohtani | H01M 8/2465 429/443 |
| 2020/0276909 A1 | 9/2020 | Boisen et al. | |

FOREIGN PATENT DOCUMENTS

| | | |
|---|---|---|
| CN | 101958423 A | 1/2011 |
| EP | 1203418 A1 | 5/2002 |
| EP | 1 203 418 B1 | 11/2009 |

OTHER PUBLICATIONS

Office Action issued in corresponding Korean Patent Application No. 10-2022-0052468 dated Sep. 6, 2024, with English translation.
Extended European Search Report issued in corresponding European Patent Application 22186333.5 dated May 22, 2023.

* cited by examiner

*Primary Examiner* — Stewart A Fraser
(74) *Attorney, Agent, or Firm* — MORGAN, LEWIS & BOCKIUS LLP

(57) ABSTRACT

Provided is an apparatus for a fuel cell system according to an embodiment, which is associated with a distributed control module for the fuel cell system, the apparatus including a master controller and at least one slave controller connected to the master controller.

17 Claims, 8 Drawing Sheets

APPARATUS FOR FUEL CELL SYSTEM

CROSS-REFERENCE TO RELATED APPLICATION

This application claims priority to and the benefit of Korean Patent Application No. 10-2022-0052468, filed on Apr. 28, 2022, the disclosure of which is incorporated herein by reference in its entirety.

BACKGROUND

Due to the recent increase in use of fuel cell systems, technology for a control module for a fuel cell system is being studied. However, there is a limit to controlling various types of fuel cell systems by a control method for a fuel cell system of the related art.

Although research is being conducted to solve problems of the control method of the related art, there are various problems, for example, in redesigning of a relevant control module, and these problems have yet to be solved.

SUMMARY OF THE INVENTION

An embodiment of the present disclosure relates to an apparatus for a fuel cell system and a control device and method for the fuel cell system, and more particularly, to a distributed control module for a fuel cell system.

An apparatus for a fuel cell system according to an embodiment includes a master controller and at least one slave controller connected to the master controller.

According to an embodiment, the at least one slave controller may be connected to a valve connected to a hydrogen tank.

According to an embodiment, the at least one slave controller may include a first slave controller and a second slave controller, the first slave controller may be connected to a first hydrogen tank valve, and the second slave controller may be connected to a second hydrogen tank valve.

According to an embodiment, the apparatus for a fuel cell system may further include a first hydrogen tank connected to the first hydrogen tank valve, and a second hydrogen tank connected to the second hydrogen tank valve.

According to an embodiment, the master controller may include a master connector for connection to the at least one slave controller.

According to an embodiment, the at least one slave controller may include a slave connector for connection to the master controller.

According to an embodiment, the at least one slave controller may further include a hydrogen tank valve connector for connection to a hydrogen tank valve.

According to an embodiment, the control device for a fuel cell system may further include a fuel cell controller configured to deliver a control command regarding the hydrogen tank valve to the master controller.

A control device for a fuel cell system according to an embodiment includes a master controller configured to manage the fuel cell system, and at least one slave controller configured to manage a fuel cell of the fuel cell system, wherein the at least one slave controller is connected to the master controller.

According to an embodiment, the at least one slave controller may manage a valve connected to a hydrogen tank or the hydrogen tank.

According to an embodiment, the at least one slave controller may manage the valve or the hydrogen tank on the basis of the temperature or pressure of the hydrogen tank.

According to an embodiment, the at least one slave controller may transmit information about the valve or the hydrogen tank to the master controller.

According to an embodiment, the master controller may manage the fuel cell system on the basis of the information about the valve or the hydrogen tank, the information being received from the at least one slave controller.

According to an embodiment, the apparatus for a fuel cell system may further include a fuel cell controller configured to transmit a control command regarding the valve to the master controller.

A control method of a fuel cell system according to an embodiment includes managing the fuel cell system using a master controller, and managing a fuel cell of the fuel cell system using at least one slave controller, wherein the at least one slave controller is connected to the master controller.

According to an embodiment, the managing of the fuel cell may include managing a valve connected to a hydrogen tank or the hydrogen tank.

According to an embodiment, the managing of the fuel cell may include managing the valve or the hydrogen tank on the basis of the temperature or pressure of the hydrogen tank.

According to an embodiment, the managing of the fuel cell may include transmitting information about the valve or the hydrogen tank to the master controller.

According to an embodiment, the managing of the fuel cell system may include managing the fuel cell system on the basis of the information about the valve or the hydrogen tank, the information being received from the at least one slave controller.

According to an embodiment, the control method may further include transmitting a control command about the valve to the master controller using a fuel cell controller.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present disclosure will be described in detail with reference to the accompanying drawings.

However, the technical idea of the present disclosure is not limited to the embodiments set forth herein and may be implemented in many different forms and one or more components in the embodiments may be selectively combined or replaced with other components without departing from the scope of the present disclosure.

Unless otherwise defined, all terms (including technical and scientific terms) used in embodiments of the present disclosure have the same meaning as commonly understood by one of ordinary skill in the art to which the present disclosure belongs. It will be understood that terms, such as those defined in commonly used dictionaries, should be interpreted as having a meaning that is consistent with their meaning in the context of the relevant art.

Terms used in embodiments of the present disclosure are for the purpose of describing the embodiments only and are not intended to be limiting of the present disclosure.

As used herein, singular forms are intended to include plural forms as well, unless the context clearly indicates otherwise. It will be understood that "at least one of (or at least one or more of) A, B, and C" indicates at least one of all possible combinations of A, B, and C.

Terms such as "first," "second," "A," "B," "(a)," and "(b)" may be used to describe components of embodiment of the present disclosure.

Such terms are only for distinguishing one component from another, and the essence, order, or sequence of the components is not limited by the terms.

When a component is referred to as being "coupled to," "combined with," or "connected to" another component, it will be understood that the component is directly coupled to, combined with or connected to the other component or is coupled to, combined with or connected to the other component through another component interposed therebetween.

When one component is referred to as being formed or arranged "on (or above)" or "below (or under)" another, it will be understood that the components are in direct contact with each other or one or more components are formed or arranged therebetween. The expression "on (or above)" or "below (or under)" should be understood to include not only an upward direction but also a downward direction with respect to one component.

Hereinafter, embodiments will be described in detail with reference to the accompanying drawings, but the same or corresponding components are assigned the same reference numbers even in different drawings and are not redundantly described herein.

Figure 1:
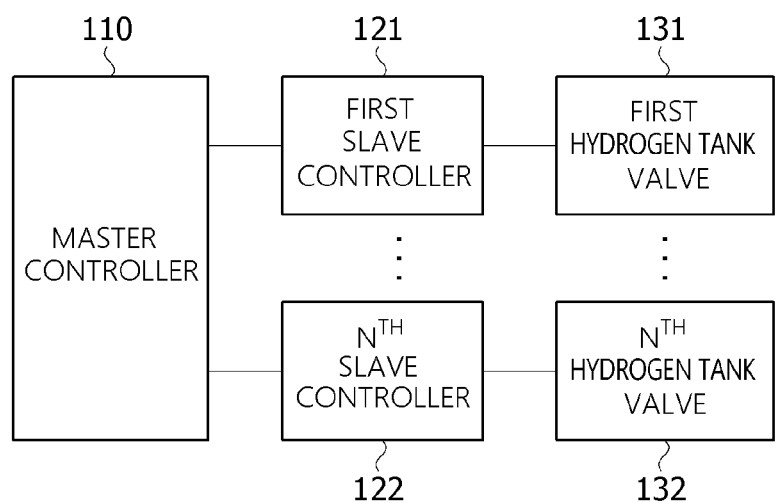
FIG. 1 is a block diagram of an apparatus for a fuel cell system according to an embodiment.

FIG. 1 is a block diagram of an apparatus for a fuel cell system according to an embodiment.

According to an embodiment, the apparatus for a fuel cell system may include a master controller 110 and at least one slave controller, e.g., slave controllers 121 and 122.

The apparatus for a fuel cell system may include at least a part of a control device for a fuel cell system to be described below. The apparatus for a fuel cell system may include a distributed module for a non-vehicle fuel cell system. The apparatus for a fuel cell system may include a non-vehicle fuel cell system, or is applicable to or usable in a non-vehicle fuel cell system.

The apparatus for a fuel cell system may include at least a part of the fuel cell system or a fuel cell. The apparatus for a fuel cell system may include at least some of an electrical circuit, an electronic circuit, a communication circuit, a processor, a semiconductor, a memory, a data transceiver, and a valve.

The apparatus for a fuel cell system may include at least some of all components used herein to describe the present disclosure or perform at least some of all operations/functions of the present disclosure.

The slave controllers 121 and 122 may be connected to the master controller 110.

According to an embodiment, the slave controllers 121 and 122 may be connected to hydrogen tank valves 131 and 132 connected to hydrogen tanks.

According to an embodiment, slave controllers may include the first slave controller 121 and the second/$n^{th}$ slave controller 122. n may be a natural number greater than or equal to 2.

The first slave controller 121 may be connected to the first hydrogen tank valve 131, and the second/$n^{th}$ slave controller 122 may be connected to the second/$n^{th}$ hydrogen tank valve 132.

According to an embodiment, the apparatus for a fuel cell system may further include a first hydrogen tank (not shown) connected to the first hydrogen tank valve 131, and a second/$n^{th}$ hydrogen tank (not shown) connected to the second/$n^{th}$ hydrogen tank valve 132.

According to an embodiment, the master controller 110 may include a master connector for connection to the slave controllers 121 and 122.

According to an embodiment, the slave controllers 121 and 122 may each include a slave connector for connection to the master controller 110.

According to an embodiment, the slave controllers 121 and 122 may further include hydrogen tank valve connectors for connection to the hydrogen tank valves 131 and 132.

According to an embodiment, the apparatus for a fuel cell system may further include a fuel cell controller (not shown) for transmitting a control command regarding the hydrogen tank valves 131 and 132 to the master controller 110.

The apparatus for a fuel cell system may be designed as a distributed type and may form a topology.

The apparatus for a fuel cell system may be divided into a master controller and a slave controller and manufactured as a module type to facilitate scalability.

In the apparatus for a fuel cell system, only a component that malfunctions may be replaced.

In the apparatus for a fuel cell system, elements to be modified may be limited as much as possible to replace a centralized hydrogen storage system management unit (HMU) of three hydrogen tanks.

The apparatus for a fuel cell system is capable of preventing a change of software (SW) and hardware (HW) of balance of plant (BoP).

Figure 2:
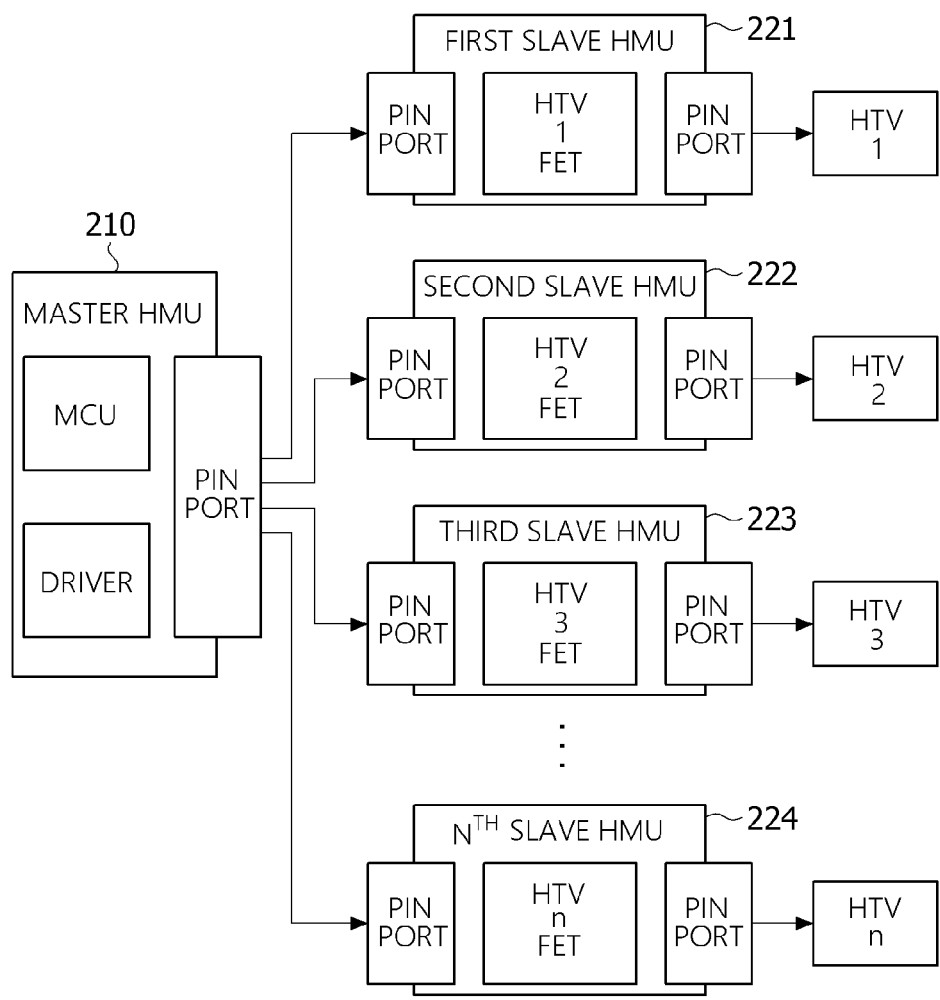
FIG. 2 is a diagram illustrating an apparatus for a fuel cell system according to an embodiment.

FIG. 2 is a diagram illustrating an apparatus for a fuel cell system according to an embodiment.

The apparatus for a fuel cell system includes a printed circuit board (PCB) having a simpler wiring than a PCB of an existing centralized system and may contribute to reducing the artwork or time. In addition, the apparatus for a fuel cell system may contribute to making a diagnostic system and a fail-safety algorithm for finding problems simpler and easier to understand.

In the apparatus for a fuel cell system, after-sales service (AS) characteristics are considered, thus reducing replacement costs and time when a problem is found.

The apparatus for a fuel cell system may be supplied and managed in the form of an assembly of slave controllers and hydrogen tanks, because specifications of the hydrogen tanks may be unified.

The apparatus for a fuel cell system is classified as a hydrogen-related machine part and thus may be classified as a high-risk product when certified as non-vehicle products, and the number of the possible routes may be increased by adding redundancy to a master-slave structure.

The apparatus for a fuel cell system is capable of dealing with an unexpected situation on its own. The apparatus for a fuel cell system is capable of detecting an abnormal operation when at least a part of a fuel cell system or fuel cell does not operate normally, and controlling the part to operate normally or shutting off the part having the problem.

A master controller and a slave controller of the apparatus for a fuel cell system need not be connected to each other via wire. The master controller may include a master HMU, and the slave controller may include a slave HMU.

The master controller and the slave controller may be directly coupled to each other through a connector. The master controller and the slave controller may be connected through a board-to-board (B to B) connector and included in a housing.

According to an embodiment, the master controller 210 may include a master connector for connection to slave controllers 221, 222, 223 and 224. The master connector may include a connector or pin port. The master controller 210 may include a micro controller unit (MCU), a driver, etc.

According to an embodiment, each of the slave controllers 221, 222, 223, and 224 may include a slave connector for connection to the master controller 210. The slave connector may include a connector or pin port.

According to an embodiment, the slave controllers 221, 222, 223, and 224 may further include hydrogen tank valve connectors for connection to hydrogen tank valves HTV1, HTV2, HTV3, . . . HTVn respectively. The hydrogen tank valve connectors may each include a connector or pin port.

Figure 3:
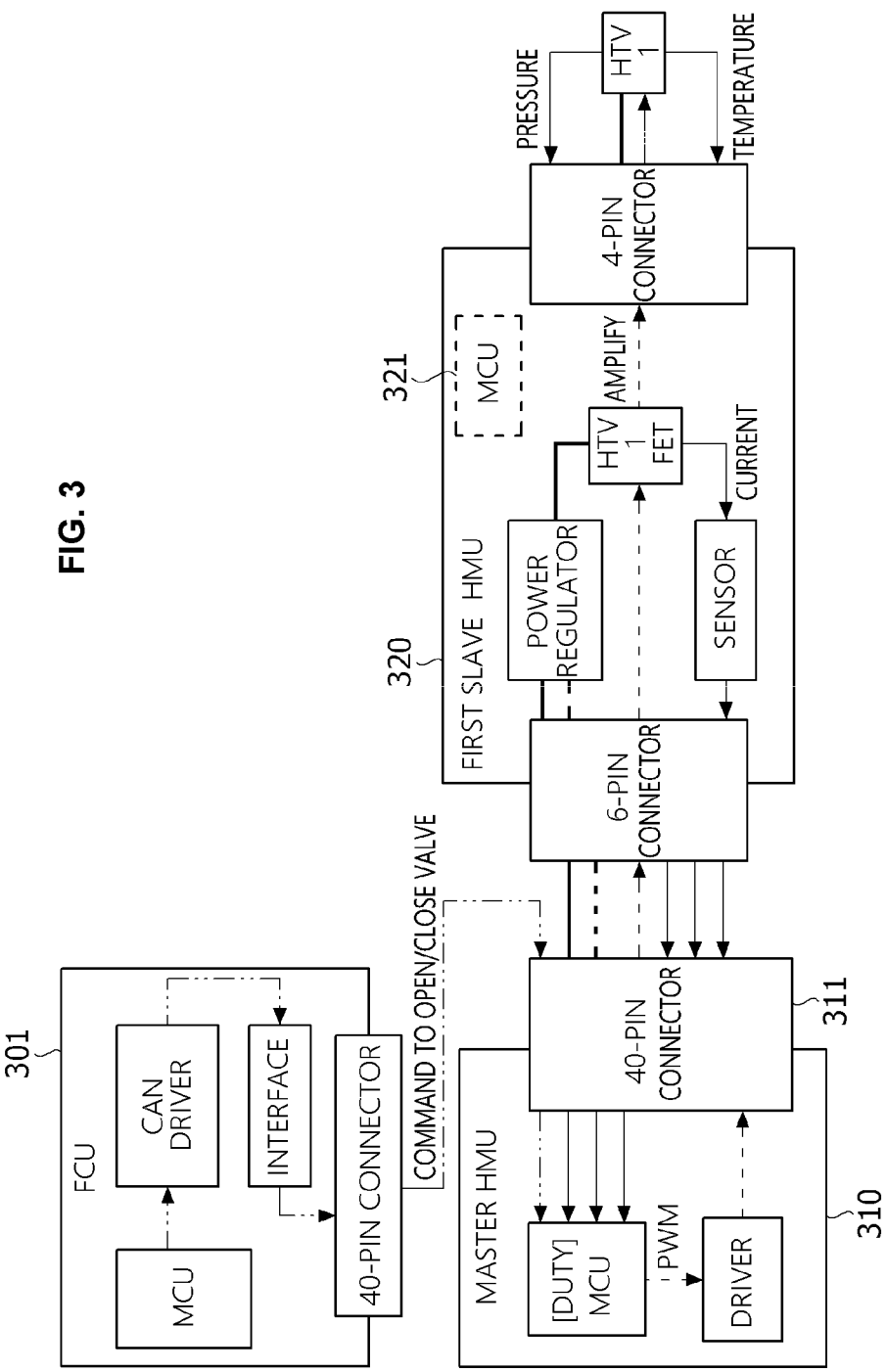
FIG. 3 is a diagram illustrating a configuration of an apparatus for a fuel cell system according to an embodiment.

FIG. 3 is a diagram illustrating a configuration of an apparatus for a fuel cell system according to an embodiment.

The apparatus for a fuel cell system may further include a fuel cell controller (FCU) 301 for transmitting a control command regarding a hydrogen tank valve HTV1 to a master controller 310.

The FCU 301 may include a fuel cell control connector for connection to the master controller 310. The fuel cell control connector may include a connector or pin port and include a 40-pin connector.

The FCU 301 may include an MCU, a controller area network (CAN) driver, an interface, etc.

The master controller 310 may include a master connector 311 for connection to the slave controller 320 or the FCU 301. The master connector 311 may include a 40-pin connector.

The master connector 311 may be connected up to about six to slave controllers or slave modules, and the number of pins of the master connector 311 may actually be increased.

Even when the size of a hydrogen tank or specifications of a hydrogen tank valve HTV are changed, a master controller may be used as it is by changing only slave controllers.

The slave controller 320 may include a slave connector for connection to the master controller 310. The slave connector may include a 6-pin connector. The slave controller 320 may include a hydrogen tank valve connector for connection to the hydrogen tank valve HTV1. The hydrogen tank valve connector may include a 4-pin connector.

The slave controller 320 may include a power regulator, a field-effect transistor (FET) HTV1 FET for the hydrogen tank valve HTV1, a sensor or sensing unit, an MCU 321, etc.

The MCU 321 may be configured to have low specifications and added to a slave controller for more precise control of an HMU or bidirectional checking.

A signal/control signal generated by the MCU of the FCU 301 may be transmitted/delivered to the master controller 310 through a CAN driver, an interface, or a connector.

A command to open or close a valve, which is delivered by the FCU 301, may be delivered to the MCU of the master controller 310 through a connector (the fuel cell control connector and a master connector). The MCU of the master controller 310 may deliver the signal of the pulse width modulation (PWM) to a driver of the master controller 310 or perform control using PWM according to duty. The driver of the master controller 310 may transmit a signal output therefrom to the FET of the slave controller 320 through a connector (the master connector and the slave connector). The FET of the slave controller 320 may receive and amplify the signal output from the driver.

The slave controller 320 may receive information or a signal of pressure or temperature of a hydrogen tank/hydrogen tank valve from the hydrogen tank valve HTV1 through a connector (the hydrogen tank valve connector). The slave controller 320 may receive, be supplied with or sense current from the FET of the slave controller 320 using a sensor/sensing unit, and transmit/deliver the received/supplied or sensed information/signal to the MCU of the master controller 310 through a connector (the master connector or the slave connector).

Figure 4:
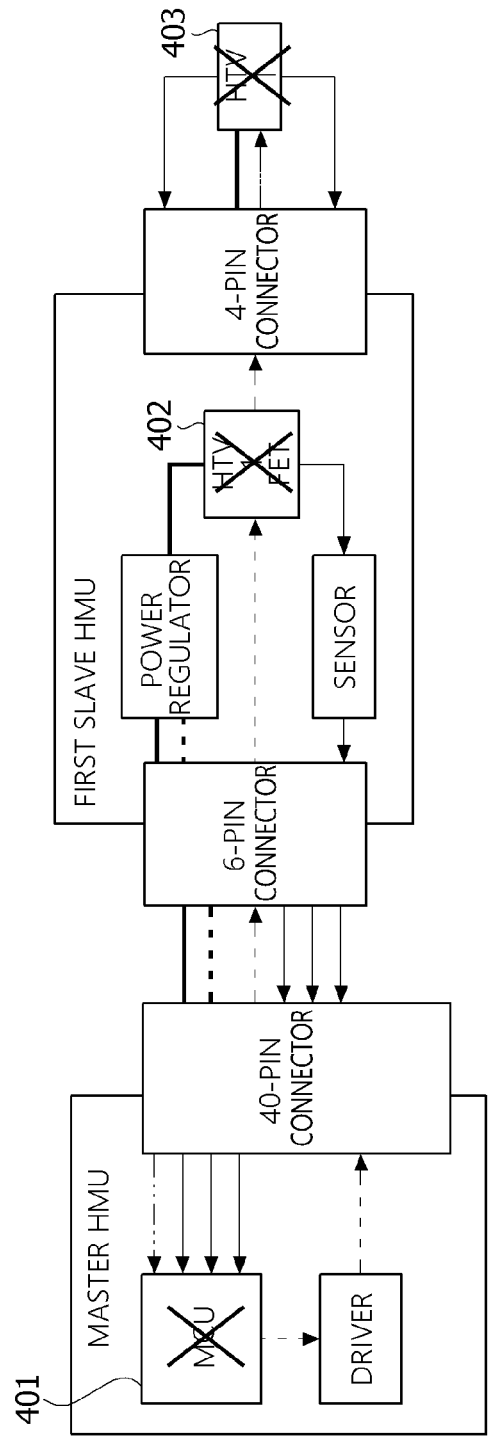
FIG. 4 is a diagram for describing replacement of each module of an apparatus for a fuel cell system according to an embodiment.

FIG. 4 is a diagram for describing replacement of each module of an apparatus for a fuel cell system according to an embodiment.

In the apparatus for a fuel cell system, an MCU 401, an FET 402, a hydrogen tank valve 403, etc. are highly likely to malfunction and each of the modules may be removed and replaced when a fault occurs.

If replacement can be performed in units of modules when the FET 402 or the hydrogen tank valve 403 malfunctions, diagnosing and a fail-safety operation may be simplified and the operation of the decision logic may be accelerated in terms of an FCU.

To develop a power pack with various specifications, the system of the apparatus for a fuel cell system may be easily configured by adding a slave controller (slave HMU) for remaining pins corresponding to the number of hydrogen tanks to be used and modifying only software of the master controller (master HMU).

Figure 5:
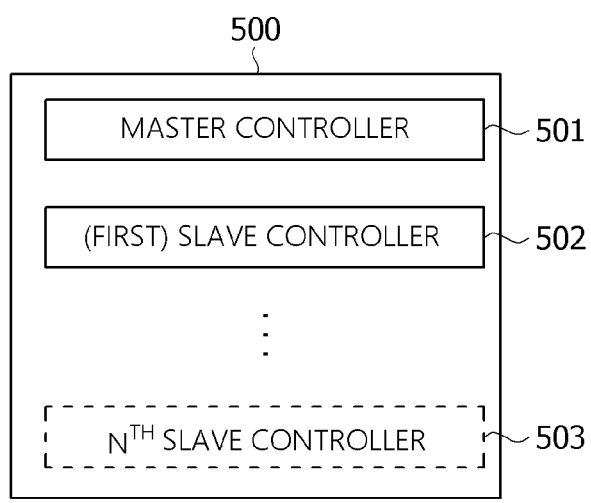
FIG. 5 is a block diagram of a control device for a fuel cell system according to an embodiment.

FIG. 5 is a block diagram of a control device for a fuel cell system according to an embodiment.

According to an embodiment, a control device 500 for a fuel cell system may include a master controller 501 for managing the fuel cell system, and at least one slave controller, e.g., slave controllers 502 and 503, for managing a fuel cell of the fuel cell system.

The control device 500 for a fuel cell system may include at least some of the components of the apparatus for a fuel cell system device described above.

The slave controllers 502 and 503 may be connected to the master controller 501.

According to an embodiment, the slave controllers 502 and 503 may manage valves connected to hydrogen tanks or the hydrogen tanks.

According to an embodiment, the slave controllers 502 and 503 may manage the valves or the hydrogen tanks on the basis of the temperature or pressure of the hydrogen tanks.

According to an embodiment, the slave controllers 502 and 503 may transmit information about the valves or the hydrogen tanks to the master controller 501.

According to an embodiment, the master controller 501 may manage the fuel cell system on the basis of the information about valves or the hydrogen tanks received from the slave controllers 502 and 503.

According to an embodiment, the control device 500 for a fuel cell system may further include a fuel cell controller (not shown) that delivers a control command regarding the valves to the master controller 501.

Figure 6:
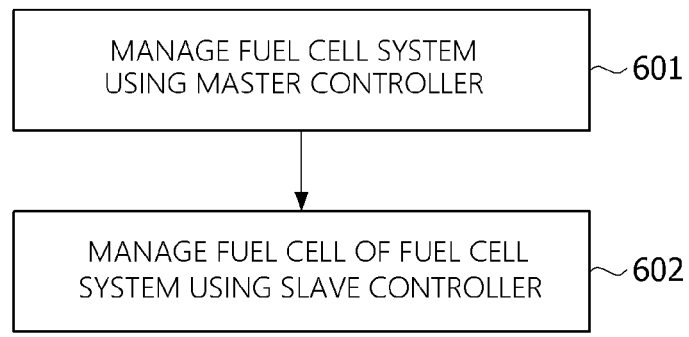
FIG. 6 is a flowchart of a control method of a fuel cell system according to an embodiment.

FIG. 6 is a flowchart of a control method of a fuel cell system according to an embodiment.

Referring to FIG. 6, operations of the control method of a fuel cell system may be performed by at least some of the components of the control device for a fuel cell system described above.

In operation 601, the control device for a fuel cell system may manage the fuel cell system using a master controller.

In operation 602, the control device for a fuel cell system may manage a fuel cell of the fuel cell system using at least one slave controller.

The at least one slave controller may be connected to the master controller.

According to an embodiment, the control device for a fuel cell system may manage a valve connected to a hydrogen tank or the hydrogen tank.

According to an embodiment, the control device for a fuel cell system may manage a valve or a hydrogen tank on the basis of the temperature or pressure of the hydrogen tank.

According to an embodiment, the control device for a fuel cell system may transmit information about the valve or the hydrogen tank to the master controller.

According to an embodiment, the control device for a fuel cell system may manage the fuel cell system on the basis of information about a valve or a hydrogen tank received from a slave controller.

According to an embodiment, the control device for a fuel cell system may deliver a control command regarding a valve to the master controller using a fuel cell controller.

Figure 7:
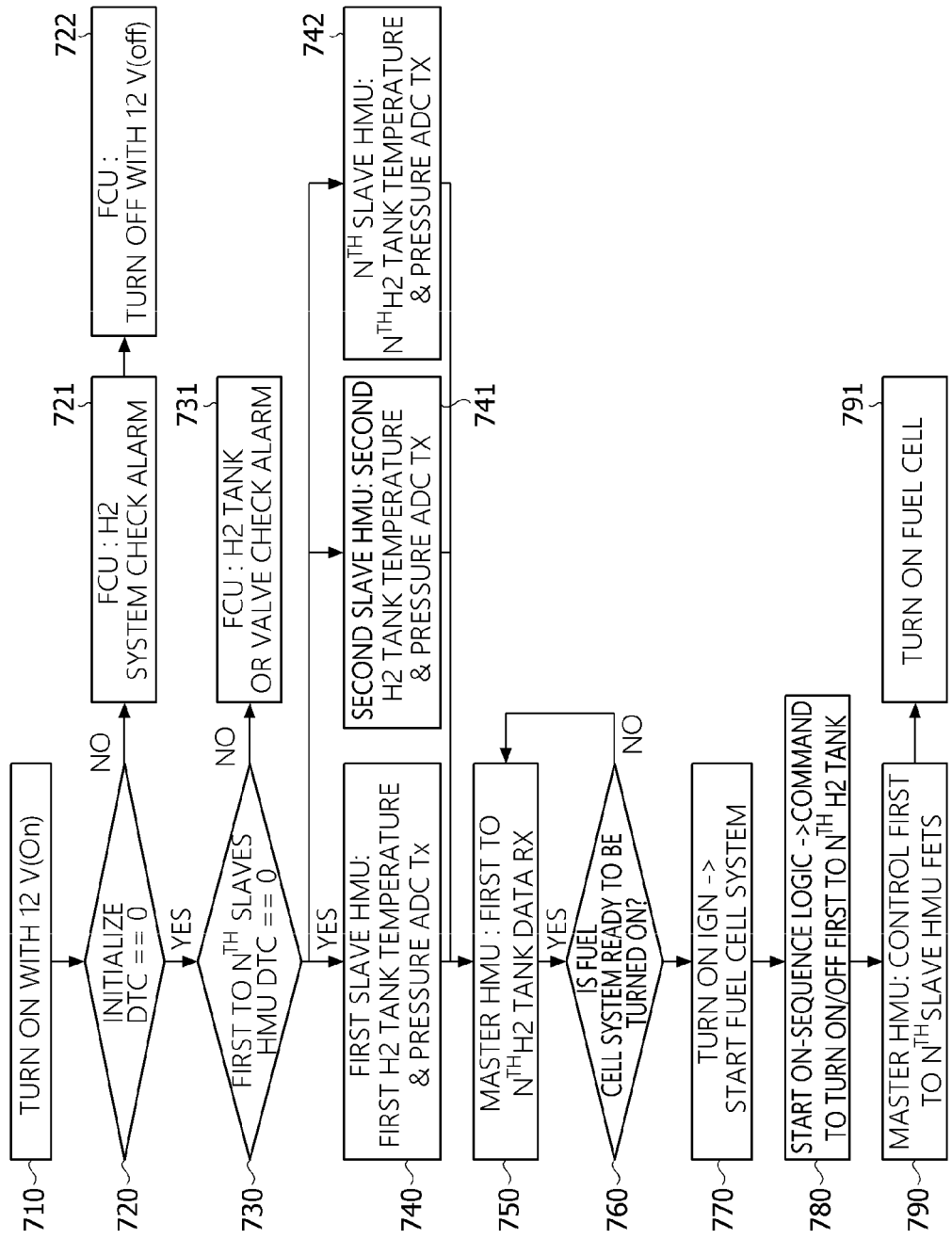
FIG. 7 is a flowchart of a control method of a fuel cell system according to an embodiment.

FIG. 7 is a flowchart of a control method of a fuel cell system according to an embodiment.

In the control method of a fuel cell system, a control device for a fuel cell system may start a fuel cell system.

In operation 710, 12 V under control of a user or administrator of the fuel cell system may be provided, and the control device for a fuel cell system would turn on at least a part of the fuel cell system with the control.

In operation 720, the control device for a fuel cell system may perform initialization using a master controller (HMU) and may check whether a diagnostic trouble code (DTC) is zero.

In operation 721, when the DTC is not zero, the control device for a fuel cell system may provide an alarm for checking a hydrogen ($H_2$) system/fuel cell system or deliver/transmit the alarm to a user terminal/administrator terminal using an FCU.

In operation 722, the control device for a fuel cell system may turn off at least a part of the fuel cell system with 12 V using an FCU.

In operation 730, when the DTC is zero, the control device for a fuel cell system may check whether the DTC of the first to $n^{th}$ slave controllers (HMUs) is zero using a master controller (master HMU).

In operation 731, when the DTC of at least some of the first to $n^{th}$ slave controllers is not zero, the control device for a fuel cell system may provide an alarm for checking hydrogen tanks or valves connected to the slave controllers having the DTC that is not zero/alarm for a hydrogen tank valve or deliver/transmit the alarm to a user terminal/administrator terminal.

In operation 740, when a DTC of all of the first to $n^{th}$ slave controllers is zero, the control device for a fuel cell system may allow information or a signal about the temperature and pressure of a first hydrogen tank to which the first slave controller is connected to be transmitted to a master controller using an analog-to-digital converter (ADC).

In operation 741, the control device for a fuel cell system may allow information or a signal about the temperature and pressure of a second hydrogen tank to which the second slave controller is connected to be transmitted to the master controller using the ADC.

In operation 742, the control device for a fuel cell system may allow information or a signal about the temperature and pressure of a third hydrogen tank to which the third slave controller is connected to be transmitted to the master controller using the ADC.

In operation 750, the controller device for a fuel cell system may allow the master controller to receive data or information about the first to $n^{th}$ hydrogen tanks connected to the first to $n^{th}$ slave controllers respectively from all of the first to $n^{th}$ slave controllers.

In operation 760, the control device for a fuel cell system may check whether the fuel cell system is ready to be turned on(ON) using an FCU.

When the fuel cell system is not ready to be turned on(ON), operation 750 may be returned to and operations 750 and 760 may be performed repeatedly.

In operation 770, when the fuel cell system is ready to be turned on, the control device for a fuel cell system may start the fuel cell system by turning on an ignition/power device and so on, under control of a user or an administrator.

In operation 780, the control device for a fuel cell system may start an on-sequence logic and transmit a command of ON/OFF to turn on or off the first to $n^{th}$ hydrogen tanks using the FCU.

In operation 790, the control device for a fuel cell system may control FETs of the first to $n^{th}$ slave controllers using the master controller.

In operation 791, the control device for a fuel cell system may turn on a fuel cell under control of the user or administrator.

Figure 8:
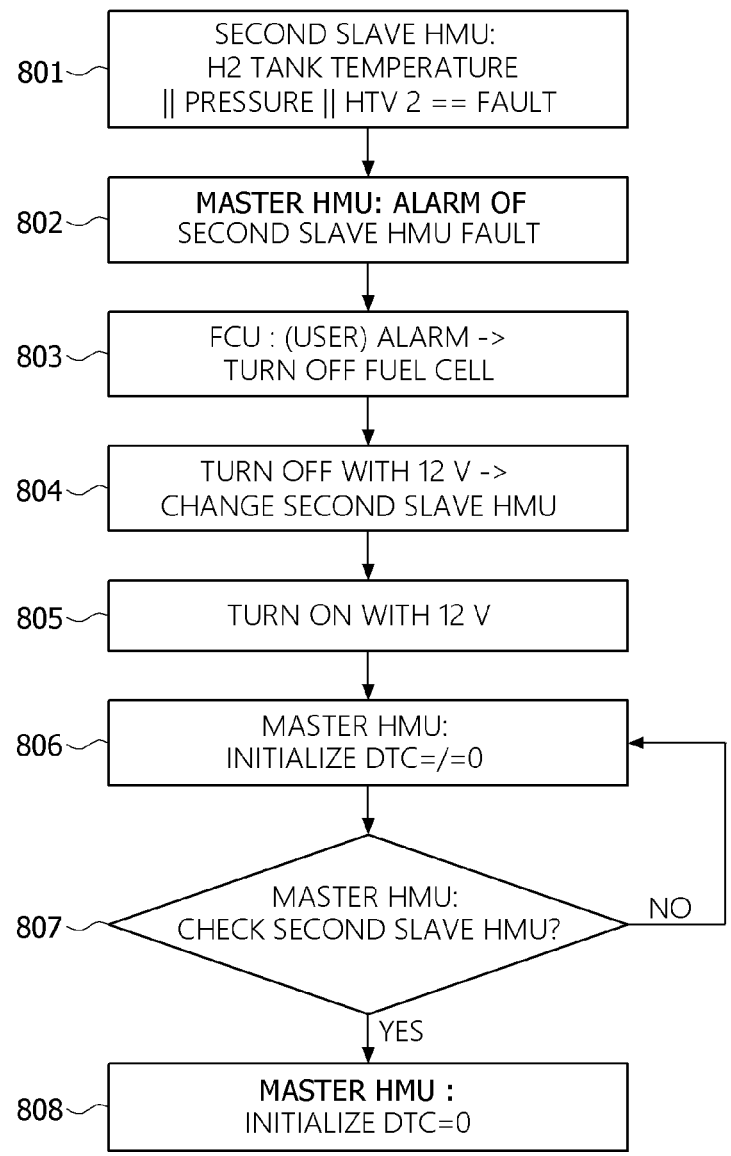
FIG. 8 is a flowchart of a control method of a fuel cell system according to an embodiment.

FIG. 8 is a flowchart of a control method of a fuel cell system according to an embodiment.

In the control method of a fuel cell system, a control device for a fuel cell system may detect or fix/solve the error/problem in a hydrogen tank during an operation of the fuel cell system.

In operation 801, the control device for a fuel cell system may check whether there is a fault in the temperature/pressure/second hydrogen tank valve (or $n^{th}$ hydrogen tank valve) of a second hydrogen tank (or an $n^{th}$ hydrogen tank) using a second slave controller (or an $n^{th}$ slave controller).

In operation 802, the control device for a fuel cell system may provide or transmit an alarm about the fault of the second slave controller (or the $n^{th}$ slave controller) using the master controller.

In operation 803, the control device for a fuel cell system may provide or transmit a (user) alarm and turn off a fuel cell using an FCU.

In operation 804, the control device for a fuel cell system may perform turn off not to apply 12 V under control of the user or administrator and may control the second slave device.

In operation 805, the control device for a fuel cell system may perform turn on to apply 12 V under control of the user or administrator.

In operation 806, the control device for a fuel cell system may perform initialization using the master controller, and set a DTC to a non-zero value.

In operation 807, the control device for a fuel cell system may identify/check the second slave controller using the master controller.

When the second slave controller is not identified/checked, the control device for a fuel cell system may return to operation 806 and perform operations 806 and 807.

In operation 808, when the second slave controller is identified/checked, the control device for a fuel cell system may perform initialization using the master controller and set the DTC to zero.

Thereafter, the control device for a fuel cell system may perform the start sequence of FIG. 7.

The term "unit" used in the embodiments set forth herein should be understood to mean a software or hardware component, such as a field-programmable gate array (FPGA) or an application-specific integrated circuit (ASIC), which performs certain functions. However, the term "unit" is not limited to software or hardware. A "unit" may be configured to be stored in an addressable storage medium or to reproduce one or more processors. Thus, the term "unit" may include, for example, components such as software components, object-oriented software components, class components, and task components, processes, functions, attributes, procedures, subroutines, segments of program code, drivers, firmware, microcode, circuits, data, databases, data structures, tables, arrays, and parameters. Components and functions provided in "units" may be combined into a smaller number of components and "units" or may be divided into sub-components and "sub-units." In addition, the components and "units" may be implemented to execute one or more CPUs in a device or a secure multimedia card.

While the present disclosure has been described above with respect to exemplary embodiments thereof, it should be understood by those of ordinary skill in the art that various changes and modifications may be made without departing from the technical concept and scope of the present disclosure defined in the following claims.

What is claimed is:

1. An apparatus for a fuel cell system, the apparatus comprising:
   a master controller;
   at least one slave controller connected to the master controller; and
   a fuel cell controller configured to transmit a control command regarding a corresponding hydrogen tank valve to the master controller,
   wherein the at least one slave controller comprises a first slave controller and a second slave controller,
   wherein the first slave controller is connected to a first hydrogen tank valve,
   wherein the second slave controller is connected to a second hydrogen tank valve, and
   wherein, when DTC (Diagnostic Trouble Code) of the at least one slave controller is not zero, the fuel cell controller is configured to transmit an alarm for checking hydrogen tanks or valves, connected to a slave controller having the DTC that is not zero.

2. The apparatus of claim 1, wherein the at least one slave controller is connected to a valve connected to a corresponding hydrogen tank.

3. The apparatus of claim 1, further comprising:
   a first hydrogen tank connected to the first hydrogen tank valve; and
   a second hydrogen tank connected to the second hydrogen tank valve.

4. The apparatus of claim 1, wherein the master controller comprises a master connector for connection to the at least one slave controller.

5. The apparatus of claim 1, wherein the at least one slave controller comprises a slave connector for connection to the master controller.

6. The apparatus of claim 5, wherein the at least one slave controller further comprises a hydrogen tank valve connector for connection to a corresponding hydrogen tank valve.

7. A control device for a fuel cell system, the control device comprising:
   a master controller configured to manage the fuel cell system;
   at least one slave controller configured to manage a fuel cell of the fuel cell system; and
   a fuel cell controller configured to transmit a control command regarding a corresponding hydrogen tank valve to the master controller,
   wherein the at least one slave controller is connected to the master controller,
   wherein the at least one slave controller comprises a first slave controller and a second slave controller,
   wherein the first slave controller is connected to a first hydrogen tank valve,
   wherein the second slave controller is connected to a second hydrogen tank valve, and
   wherein when DTC (Diagnostic Trouble Code) of the at least one slave controller is not zero, wherein the fuel cell controller configured is to transmit an alarm for checking hydrogen tanks or valves, connected to the slave controller having the DTC that is not zero.

8. The control device of claim 7, wherein the at least one slave controller manages a hydrogen tank or a valve connected to the hydrogen tank.

9. The control device of claim 8, wherein the at least one slave controller manages the valve or the hydrogen tank on the basis of temperature or pressure of the hydrogen tank.

10. The control device of claim 8, wherein the at least one slave controller transmits information about the valve or the hydrogen tank to the master controller.

11. The control device of claim 10, wherein the master controller manages the fuel cell system on the basis of the information about the valve or the hydrogen tank received from the at least one slave controller.

12. A control method of a fuel cell system, the method comprising:
   managing the fuel cell system using a master controller;
   managing a fuel cell of the fuel cell system using at least one slave controller; and
   transmitting an alarm for checking hydrogen tanks or valves, connected to at least one slave controller having DTC (Diagnostic Trouble Code) that is not zero using a fuel cell controller when the DTC of at least one slave controller is not zero,
   wherein the at least one slave controller is connected to the master controller,
   wherein the at least one slave controller comprises a first slave controller and a second slave controller,
   wherein the first slave controller is connected to a first hydrogen tank valve, and
   wherein the second slave controller is connected to a second hydrogen tank valve.

13. The control method of claim 12, wherein the managing of the fuel cell comprises managing a hydrogen tank or a valve connected to the hydrogen tank.

14. The control method of claim 13, wherein the managing of the fuel cell comprises managing the valve or the hydrogen tank on the basis of temperature or pressure of the hydrogen tank.

15. The control method of claim 13, wherein the managing of the fuel cell comprises transmitting information about the valve or the hydrogen tank to the master controller.

16. The control method of claim 15, wherein the managing of the fuel cell system comprises managing the fuel cell system on the basis of the information about the valve or the hydrogen tank received from the at least one slave controller.

17. The control method of claim 13, further comprising transmitting a control command about the valve to the master controller using the fuel cell controller.

* * * * *